(12) United States Patent
Li et al.

(10) Patent No.: US 11,940,302 B2
(45) Date of Patent: Mar. 26, 2024

(54) DEVICE AND METHOD FOR DISPLACEMENT MEASUREMENT USED IN SENSING DEVICE

(71) Applicant: Guilin Gemred Sensor Technology Co., Ltd., Guilin (CN)

(72) Inventors: Guangjin Li, Guilin (CN); Jian Shi, Guilin (CN); Bingheng Li, Guilin (CN)

(73) Assignee: GUILIN GEMRED SENSOR TECHNOLOGY ASSIGNEE CO., LTD., Guilin (CN)

( * ) Notice: Subject to any disclaimer, the term of this patent is extended or adjusted under 35 U.S.C. 154(b) by 793 days.

(21) Appl. No.: 17/033,909

(22) Filed: Sep. 27, 2020

(65) Prior Publication Data

US 2021/0010831 A1    Jan. 14, 2021

Related U.S. Application Data

(63) Continuation-in-part of application No. PCT/CN2019/079193, filed on Mar. 22, 2019.

(30) Foreign Application Priority Data

Apr. 23, 2018   (CN) .......................... 201810365459.X

(51) Int. Cl.
    *G01D 5/241*   (2006.01)
    *G01D 5/249*   (2006.01)

(52) U.S. Cl.
    CPC .......... *G01D 5/2415* (2013.01); *G01D 5/2497* (2013.01)

(58) Field of Classification Search
    CPC ...... G01D 5/2415; G01D 5/2497; G01D 5/12; G01D 5/14; G01D 5/24; G01D 5/241; G01D 5/2417; G01D 5/2412; G01B 7/02
    See application file for complete search history.

(56) References Cited

U.S. PATENT DOCUMENTS 4,733,235 A * 3/1988 Baer .................... G01D 5/2403
                                                324/683

* cited by examiner

*Primary Examiner* — Jung Kim
(74) *Attorney, Agent, or Firm* — MATTHIAS SCHOLL P.C.; Matthias Scholl

(57) ABSTRACT

A displacement measurement device for a sensing device. The sensing device includes a first displacement sensor. The displacement measurement device includes: a drive signal generating circuit configured to output a drive signal to the first displacement sensor; a first signal processing circuit configured to receive a signal from the first displacement sensor and output a first ADSO signal; and a computing device including a first timer. The first timer is configured to receive a CLK512 signal and the first ADSO signal, and time or count according to the CLK512 signal and the first ADSO signal; and the CLK512 signal is a square wave signal related to a period and phase of the drive signal.

22 Claims, 11 Drawing Sheets

Note: The measuring principle underlying the timer 1 is the same as that of the timer 2.

DEVICE AND METHOD FOR DISPLACEMENT MEASUREMENT USED IN SENSING DEVICE

CROSS-REFERENCE TO RELATED APPLICATIONS

This application is a continuation-in-part of International Patent Application No. PCT/CN2019/079193 with an international filing date of Mar. 22, 2019, designating the United States, now pending, and further claims foreign priority benefits to Chinese Patent Application No. 201810365459.X filed Apr. 23, 2018. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

This disclosure relates to positioning and displacement measurement, and more specifically to a device and method for displacement measurement used in a sensing device.

Displacement sensors are a position measuring element used for measurement of length, angle, speed, precise positioning and follow-up tracking. Displacement sensors include capacitive transducers, inductosyns, grating sensors, etc. The capacitive grating transducers belong to the capacitive transducers and can be divided into phase-detection type and amplitude-detection type. FIG. 1 shows a displacement measurement system comprising a traditional capacitive grating transducer with phase detection. Taking the grating spacing as the measurement period, the position of the gate of the capacitive grating transducer in one cycle is obtained by phase detection, and the displacement measurement of more than one cycle is realized by direction discrimination counting. As shown in FIG. 1, the displacement measurement system comprises a capacitive grating transducer 10 and a capacitive grating transducer Application Specific Integrated Circuit (ASIC) chip 20 (hereinafter referred to as ASIC chip 20 or chip 20). The ASIC chip 20 is provided with a crystal oscillator circuit 21, clock divider circuit 22, multi-channel (usually 8-channel) driving and analog switch signal generation circuit 23 (hereinafter referred to as a drive signal generating circuit 23), demodulation, amplification, filtering and comparison circuit for a capacitive signal (hereinafter referred to as a capacitive signal processing circuit 24, or a signal processing circuit 24), a phase detection and counting circuit 25, a displacement data processing circuit 26, a LCD display circuit 29, a voltage detection circuit 28 and a serial output port 27.

The signal period (512 cp) outputted by the capacitive signal processing circuit 24 corresponds to the length of a grating spacing in the capacitive grating transducer in space. Assuming that the length of a grating spacing is 5.08 mm, the minimum resolution of the displacement measurement system of the capacitive grating transducer with phase detection is 5.08 mm/512≈0.01 mm≈0.0004 inch. In this case, the phase of the Channel State Information (CSI) signal changes by 180/256 degrees for each moving unit of the moving gate of the capacitive grating transducer. Thus, the resolution of the traditional displacement measurement system based on the capacitive grating transducer with phase detection is not high.

Based on the above description, the resolution of the displacement measurement system of the traditional capacitive grating transducer has a fixed relationship with the operating frequency of the chip. To increase the resolution, a common method is to reduce the grating spacing of the capacitive grating transducer. However, due to the limitation of manufacturing and assembly technology, the reduction of the grating spacing of the capacitive grating transducer is very limited, which makes it difficult to realize high-resolution displacement measurement for the capacitive grating transducer with phase detection.

SUMMARY

Disclosed is a displacement measurement device for a sensing device, the sensing device comprising a first displacement sensor, and the displacement measurement device comprising:

a drive signal generating circuit configured to output a drive signal to the first displacement sensor;

a first signal processing circuit configured to receive a signal from the first displacement sensor and output a first ADSO signal; and a computing device comprising a first timer.

The first timer is configured to receive a CLK512 signal and the first ADSO signal, and time or count according to the CLK512 signal and the first ADSO signal; the CLK512 signal is a square wave signal related to a period and phase of the drive signal.

In a class of this embodiment, the displacement measurement device further comprises a clock frequency divider circuit configured to output a clock signal and the CLK512 signal to the drive signal generating circuit.

The computing device further comprises a processor configured to convert data obtained by the first timer through timing or counting into an absolute displacement value of a gate of the first displacement sensor within a grating spacing.

The displacement measurement device further comprises a counting clock; the first timer is configured to time or count according to the CLK512 signal and the first ADSO signal at a clock frequency provided by the counting clock.

The first timer is configured to time or count at the clock frequency starting from zero provided by the counting clock when a rising edge of the CLK512 signal is monitored, and to transmit a current time or current count to the processor when a rising edge of the first ADSO signal is monitored.

In a class of this embodiment, the displacement measurement device further comprises a first timer configured to time or count at the clock frequency starting from zero provided by the counting clock when a rising edge of the CLK512 signal is monitored, and to transmit a current time or current count to the processor when a rising edge of the first ADSO signal is monitored.

In a class of this embodiment, the first timer further comprises a first buffer; wherein the first timer is configured to time or count at the clock frequency starting from zero provided by the counting clock when a rising edge of the CLK512 signal is monitored, and to write a current time or current count to the first buffer when a rising edge of the first ADSO signal is monitored; and the processor is configured to read data in the first buffer when receiving an interrupt flag signal triggered by the first ADSO signal or the CLK512 signal.

In a class of this embodiment, the processor is configured to obtain a position equivalent of the gate of the first displacement sensor within a grating spacing according to the data obtained by the first timer through timing and the clock frequency provided by the counting clock, and convert the position equivalent of the gate of the first displacement sensor within a grating spacing to an absolute displacement value of the gate of the first displacement sensor within a grating spacing. The processor is further configured to digitally filter the position equivalent of the gate of the first displacement sensor within a grating spacing, and to correct a deviation of the absolute displacement value of the gate of the first displacement sensor within a grating spacing.

In a class of this embodiment, the counting clock is disposed in the computing device.

In a class of this embodiment, the computing device further comprises a second timer configured to receive the CLK512 signal and the first ADSO signal, and to count a number of the grating spacing of displacement of the gate of the first displacement sensor according to the CLK512 signal and the first ADSO signal; and the processor is further configured to obtain a total absolute displacement value of the gate of the first displacement sensor according to the data obtained by the second timer by counting and the data obtained by the first timer by timing or counting.

In a class of this embodiment, the drive signal generating circuit and the first signal processing circuit are integrated on a chip, and the chip further comprises: a phase detection and counting circuit configured to receive the first ADSO signal, and a serial output port configured to output a CLK signal and a DATA signal comprising displacement information of the gate of the first displacement sensor; the computing device is further configured to receive the CLK signal and the DATA signal; and the processor is further configured to obtain the number of the grating spacing of the displacement of the gate of the first displacement sensor according to the received CLK signal and the DATA signal, and to obtain the total absolute displacement value of the gate of the first displacement sensor according to the number of the grating spacing of the displacement of the gate of the first displacement sensor and the data obtained by the first timer by timing or counting.

In a class of this embodiment, the processor is configured to obtain a total absolute displacement equivalent of the gate of the first displacement sensor according to the number of the grating spacing of the displacement of the gate of the first displacement sensor and the data obtained by the first timer through timing or counting, and to convert the total absolute displacement equivalent of the gate of the first displacement sensor into a total absolute displacement value of the gate of the sensor.

In a class of this embodiment, the sensing device further comprises a second displacement sensor; the first displacement sensor comprises a plurality of grating spacings within one grating spacing of the second displacement sensor; the drive signal generating circuit is further configured to output the drive signal to the second displacement sensor; and the displacement measurement device further comprises a second signal processing circuit configured to receive a signal from the second displacement sensor and output a second ADSO signal; the computing device further comprises a third timer configured to receive the second ADSO signal and the CLK512 signal, and to time or count according to the CLK512 signal and the second ADSO signal at the clock frequency provided by the counting clock. The processor is further configured to determine the number of the grating spacing of the displacement of the gate of the first displacement sensor according to the data obtained by timing or counting of the third timer, and to obtain a total absolute displacement value of the gate of the first displacement sensor according to the number of the grating spacing of the displacement of the gate of the first displacement sensor and the data obtained by timing or counting of the first timer.

In a class of this embodiment, the third timer is configured to time or count at the clock frequency starting from zero provided by the counting clock when a rising edge of the CLK512 signal is monitored, and to transmit a current time or current count to the processor when a rising edge of the first ADSO signal is monitored, or record the current time or current count.

In a class of this embodiment, the first displacement sensor and the second displacement sensor are a capacitive grating transducer.

In a class of this embodiment, the CLK512 signal is a square wave signal with the same period and phase as the drive signal.

In a class of this embodiment, the computing device, the drive signal generating circuit, and the first signal processing circuit are integrated on a chip.

In another aspect, provided is a method for displacement measurement for a sensing device, the sensing device comprising a first displacement sensor, and the method comprising:
1) outputting a drive signal to a first displacement sensor;
2) receiving and processing a signal from the first displacement sensor, and outputting a first ADSO signal, and
3) receiving a CLK512 signal and the first ADSO signal, and timing or counting according to the CLK512 signal and the first ADSO signal, wherein the CLK512 signal is a square wave signal related to a period and phase of the drive signal.

In a class of this embodiment, the method further comprises: converting a first data obtained by timing or counting into an absolute displacement value of a gate of the first displacement sensor within a grating spacing.

In a class of this embodiment, timing or counting according to the CLK512 signal and the first ADSO signal comprises:
timing or counting at the clock frequency starting from zero when a rising edge of the CLK512 signal is monitored; and
transmitting a current time or current count when arising edge of the first ADSO signal is monitored.

In a class of this embodiment, converting a first data obtained by timing or counting into an absolute displacement value of a gate of the first displacement sensor within a grating spacing comprises:
obtaining a position equivalent of the gate of the first displacement sensor within a grating spacing according to the first data obtained through timing and the clock frequency; and
converting the position equivalent of the gate of the first displacement sensor within a grating spacing to an absolute displacement value of the gate of the first displacement sensor within a grating spacing.

In a class of this embodiment, the method further comprises:
digitally filtering the position equivalent of the gate of the first displacement sensor within a grating spacing; and
correcting a deviation of the absolute displacement value of the gate of the first displacement sensor within a grating spacing.

In a class of this embodiment, the method further comprises:
receiving the CLK512 signal and the first ADSO signal, and counting a number of the grating spacing of displacement of the gate of the first displacement sensor according to the CLK512 signal and the first ADSO signal; and obtaining a total absolute displacement value of the gate of the first displacement sensor according to a second data obtained by counting the number of the grating spacing of displacement of the gate of the first displacement sensor and the first data.

In a class of this embodiment, the sensing device further comprises a second displacement sensor; the first displacement sensor comprises a plurality of grating spacings within one grating spacing of the second displacement sensor; and the method further comprises:

outputting the drive signal to the second displacement sensor;

receiving and processing a signal from the second displacement sensor and outputting a second ADSO signal;

receiving the second ADSO signal and the CLK512 signal, and timing or counting according to the second ADSO signal and the CLK512 signal and the clock frequency, thereby yielding a third data;

determining a number of the grating spacing of the displacement of the gate of the first displacement sensor according to the third data; and obtaining a total absolute displacement value of the gate of the first displacement sensor according to the number of the grating spacing of the displacement of the gate of the first displacement sensor and the first data.

The following advantages are associated with the displacement and measurement device of the disclosure in comparison with the prior art.

The displacement measurement device of the disclosure is advantageous in low cost, high performance, high measurement resolution (e.g. micron and sub-micron scale), and high accuracy over conventional methods, without changing the original size of the coupling structure of the displacement sensor.

The displacement measurement device of the disclosure has a wide range of applications and can be used in combination with other types of capacitive sensors, inductosyns, and grating sensors in addition to the capacitive sensors.

DETAILED DESCRIPTION

To further illustrate, embodiments detailing a system and method for displacement measurement are described below. It should be noted that the following embodiments are intended to describe and not to limit the description.

Figure 1:
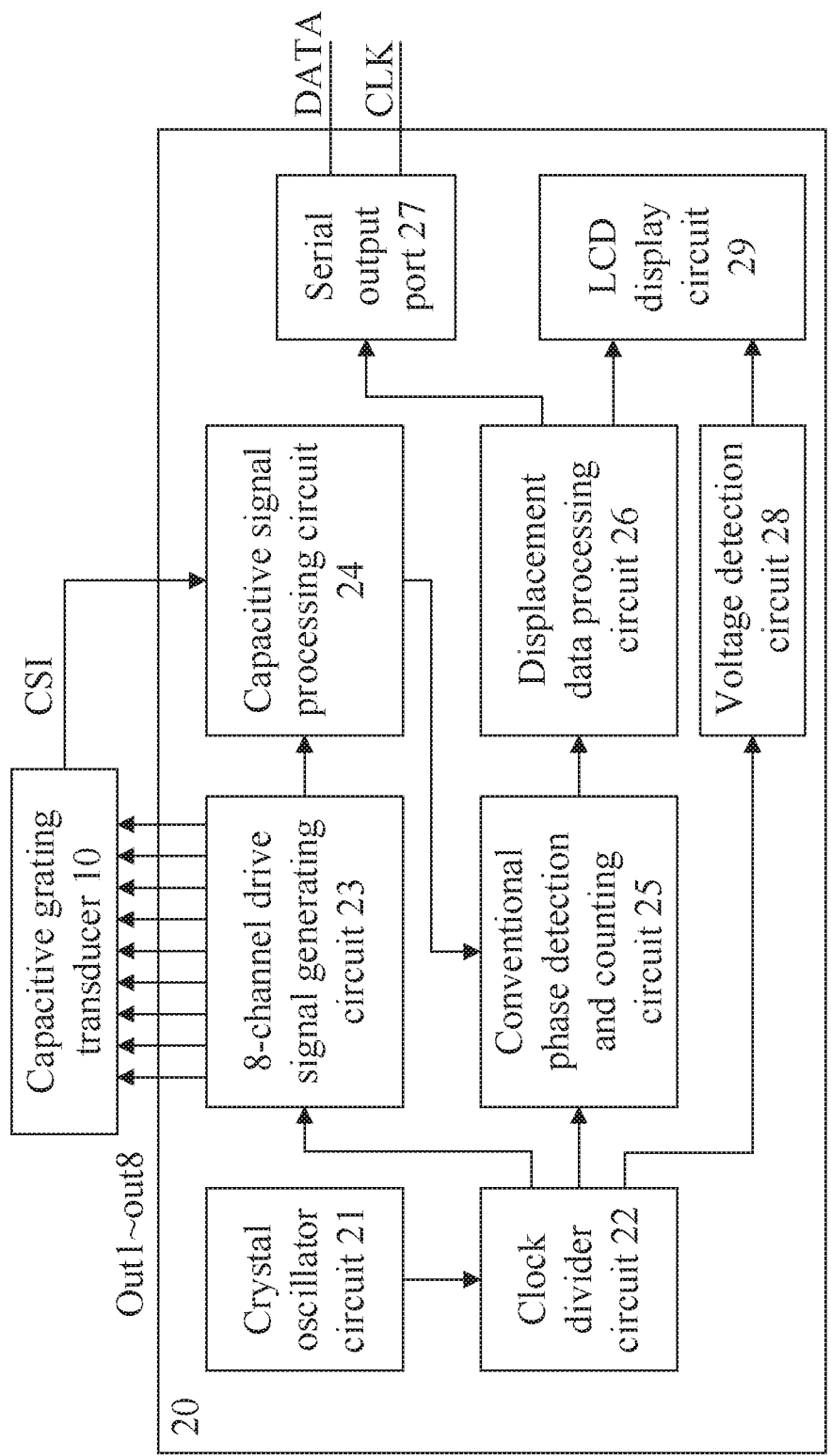
FIG. 1 is a schematic diagram of a displacement measurement system of a capacitive grating transducer with phase detection in the related art.
Figure 2:
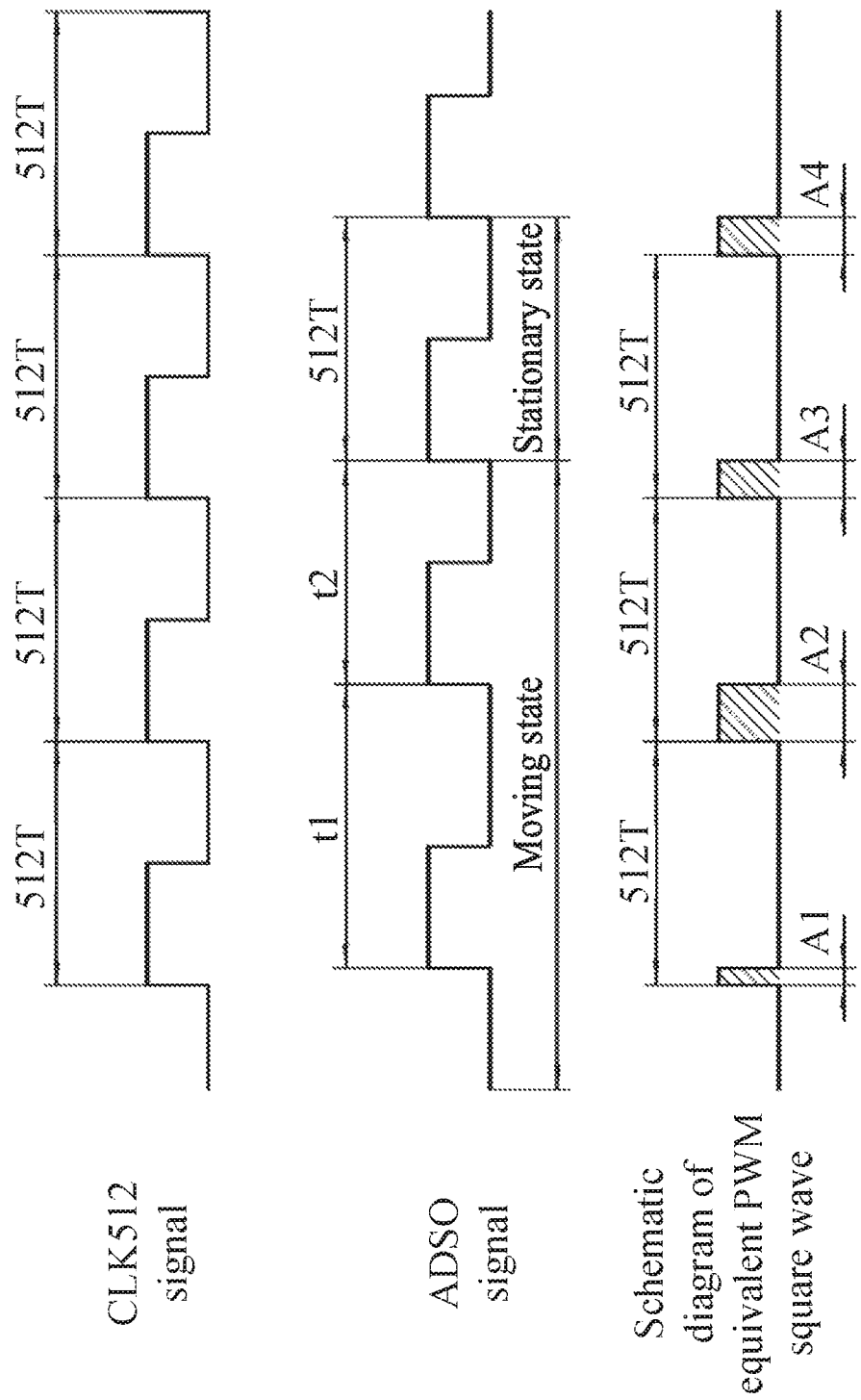
FIG. 2 is a schematic diagram of an equivalent PWM square wave modulated by an ADSO signal and mapped from a CLK512 signal and the ADSO signal according to one embodiment of the disclosure.

A study with regard to the measuring principle of a conventional phase-detection displacement measurement system shows that the multi-channel driving signal used to drive the capacitive grating transducer is generated by a clock frequency division circuit in the chip through combinational logic. The driving signal has a strict phase matching relationship with a signal (referred to as an ADSO signal in the disclosure) output from the capacitive grating transducer, and then demodulated, amplified, filtered and compared. Comparing the phase of the ADSO signal with that of a square wave signal as shown in FIG. 2 (The square wave signal has the same period and phase as the drive signal), the two phases can be mapped to an equivalent pulse-width modulation (PWM) square wave whose pulse width is modulated by the ADSO signal. The pulse width (e.g. A1, A2, A3, and A4 in FIG. 2) of the equivalent PWM square wave corresponds to the phase difference between the ADSO signal and the equivalent PWM square wave, and also corresponds to the position value of the gate located within a grating spacing in space. Compared with the prior art (in which the phase difference after phase detection is not completely linearly proportional to the displacement value of the gate of the grating sensor), the pulse width of the equivalent PWM square wave is determined considering the above corresponding relationship, further obtaining a position equivalent of the gate of the capacitive grating transducer within a grating spacing. The position equivalent of the gate is then converted to an absolute displacement value of the gate of the capacitive grating transducer within a grating spacing.

According to one embodiment of the disclosure, a displacement measurement system for a sensing device is provided to increase the resolution, where the sensing device including the capacitive grating transducer.

Figure 3:
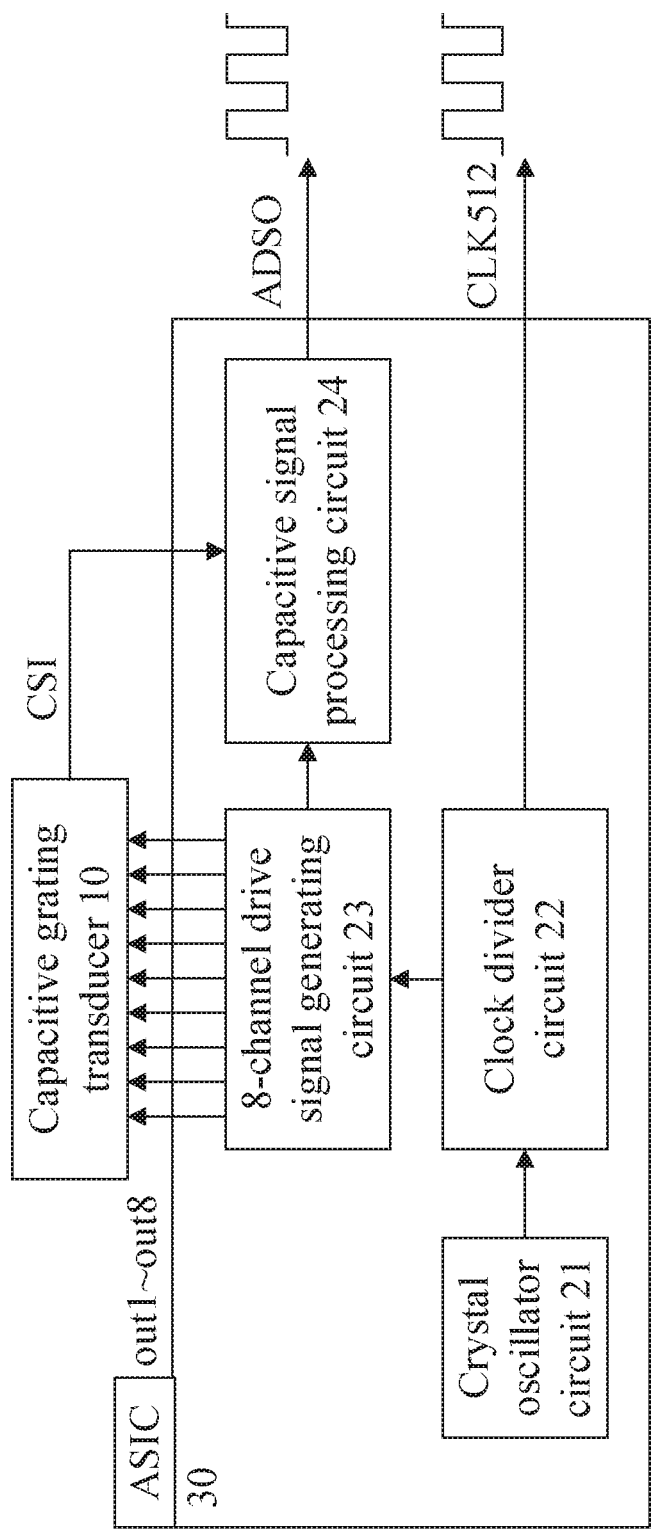
FIG. 3 is a block diagram of an ASIC chip of a displacement measurement device comprising a capacitive grating transducer according to one embodiment of the disclosure.
Figure 4:
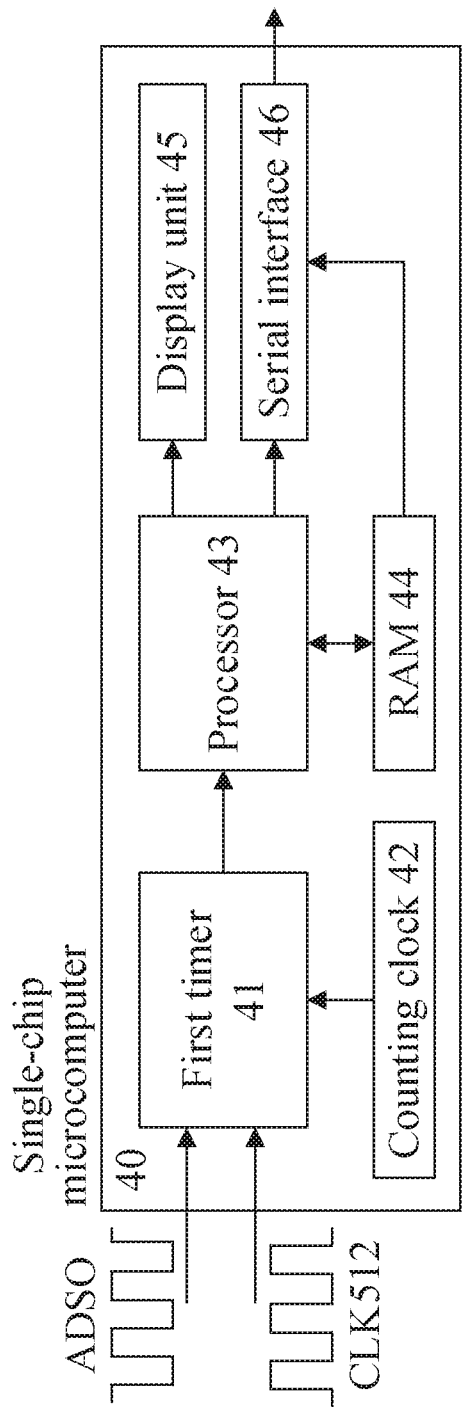
FIG. 4 is a block diagram of a single chip microcomputer of a displacement measurement device according to one embodiment of the disclosure.
Figure 5:
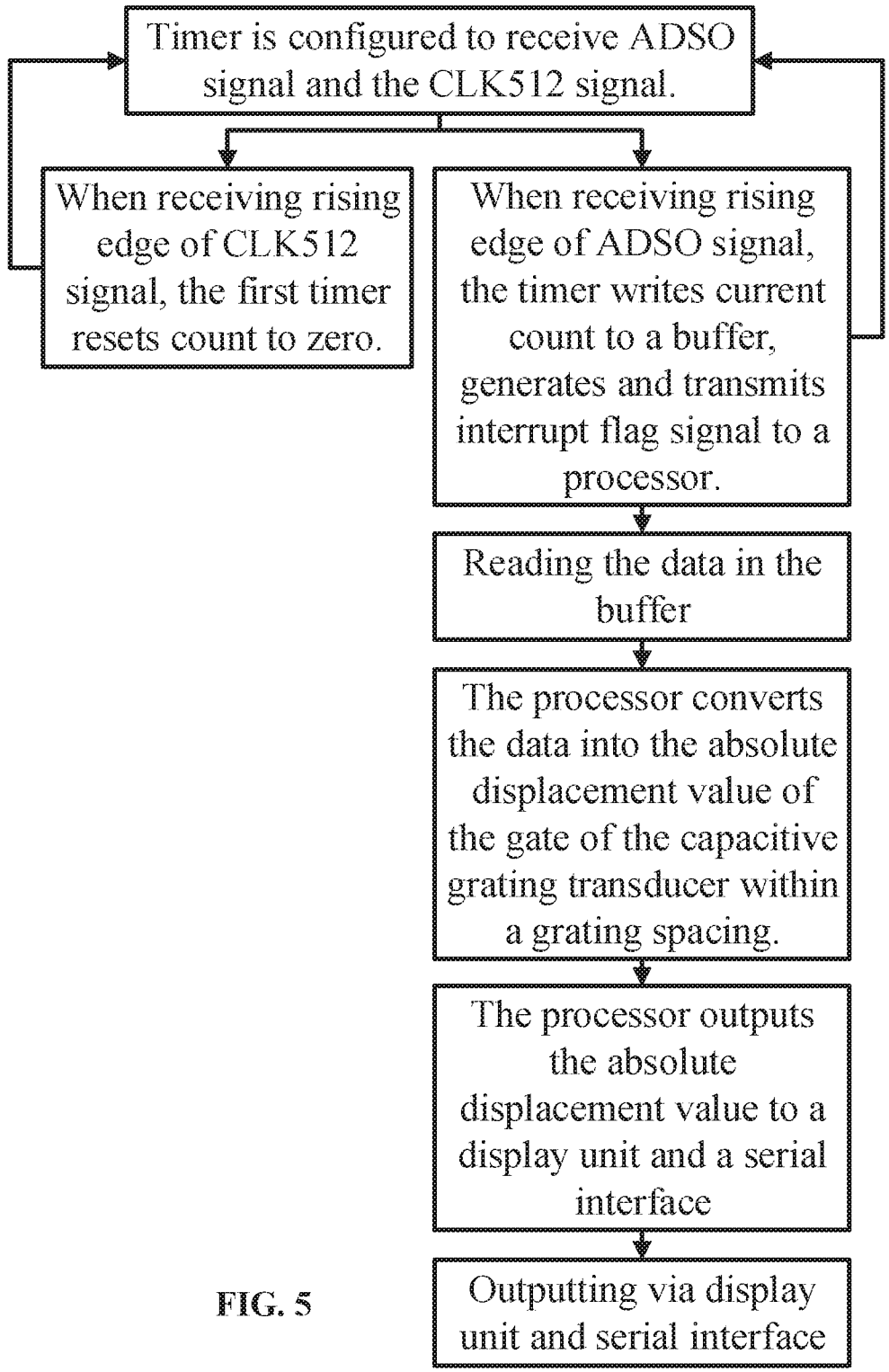
FIG. 5 is a flowchart of a single chip microcomputer according to one embodiment of the disclosure.

Referring to FIGS. 3 and 4, according to one embodiment of the disclosure, a displacement measurement system comprises an ASIC chip 30 and a single-chip microcomputer 40. The ASIC chip 30 comprises a crystal oscillator circuit 21, a clock divider circuit 22, a multi-channel drive signal generating circuit 23 (hereinafter referred to as an 8-channel drive signal generating circuit 23), and a capacitive signal processing circuit 24 (FIG. 3). The computing device 40 comprises a first timer 41, a counting clock 42, a processor 43, a random-access memory (RAM), a display unit 45, and a serial interface 46 (FIG. 40). The first timer comprises a first buffer (not shown in FIG. 4). The ASIC chip is configured to transmit an ADSO signal produced by the capacitive signal processing circuit 24 to the first timer 41. The clock divider circuit 22 is configured to transmit a clock signal to the 8-channel drive signal generating circuit, and to produce and transmit a one-channel square wave signal (also called CLK512 signal) to the first timer 41 (where the CLK512 signal has the same period as the 8-channel drive signal out1-out8. 512T is taken as an example, 1T represents the reciprocal of the operating frequency of a chip; the CLK512 signal has the same phase as the 8-channel drive signal.

Described below are working principles of the displacement measurement system in accordance with one embodiment of the disclosure:

1) On the ASIC chip 30, the crystal oscillator circuit 21 provides and transmits the clock signal to the clock divider circuit 22 that divides the input frequency of the clock signal, generates and transmits the produced clock signal of a frequency to the 8-channel drive signal generating circuit 23. The clock divider circuit 22 further generates the CLK512 signal with the same period and phase as the 8-channel drive signal. The 8-channel drive signal generating circuit 23 receives the output clock signal, generates and transmits the 8-channel drive signal to drive the capacitive grating transducer 10.

The capacitive grating transducer 10 follows the working principles as described below after receiving the 8-channel drive signal.

The capacitive grating transducer 10 further comprises an 8-channel emitter configured to receive the 8-channel drive signal output from ASIC chip 30. The capacitive grating transducer 10 moderates the 8-channel drive signal through its gate capacitance, outputs a periodic signal (i.e., channel state information signal (CSI signal)) having a different voltage amplitude, and transmits the CSI signal to the ASCI chip 30.

On the ASCI chip 30, the capacitive signal processing circuit 24 receives the CS signal, and converts it into an ADSO signal through demodulation, amplification, and comparison processes. The ADSO signal related to the displacement of the gate of the capacitive grating transducer 10 is transmitted to the single-chip microcomputer 40. A phase shift of 360 electrical degree of the ADSO signal spatially corresponds to one grating spacing of the capacitive grating transducer 10.

3) In the single-chip microcomputer 40, the first timer 41 receives the ADSO signal from the capacitive signal processing circuit 24 and the CLK512 signal from the clock divider circuit 22. In this embodiment, the first timer 41 defines the clock frequency provided by the counting clock 42 as a counting frequency (i.e., counting the number of pulses of the counting clock 42), and counts at the clock frequency when receiving the ADSO signal and the CLK512 signal. Described below are working principles of the single chip microcomputer in accordance with one embodiment of the disclosure:

3.1) The first timer 41 is configured to receive ADSO signal and the CLK512 signal. When receiving a rising edge of the CLK512 signal, the first timer 41 resets the count to zero. When receiving a rising edge of the ADSO signal, the first timer 41 writes the current count to the first buffer, generates and transmits an interrupt flag signal to the processor 43.

Referring to FIG. 2, the count written to the first buffer corresponds to one moderated pulse width (i.e., A1, A2, . . . in FIG. 2) of the equivalent PWM square wave, that is, the count written to the first buffer represents a position equivalent of the gate of the capacitive grating transducer 10 within a grating spacing. The position equivalents at different resolutions is dependent upon the clock frequencies provided by the counting clock 42 because the first timer 43 count or times at a preset clock frequency. Suppose that there is a single-chip microcomputer 40 at a clock frequency of 6 MHz and an ASIC chip 30 at an operating frequency of 153.6 kHz, and the time period of 512T signal corresponding to a grating spacing of the capacitive grating transducer 10 is given by: $512 \times 1/153.6 \times 10^{-3}$ seconds=$10/3 \times 10^{-3}$ seconds. Since the maximum count value of first timer 41 within the time period is given by $(10/3 \times 10^{-3})/(1/6 \times 10^{-6})$=20000, the position equivalent subdivision is increased by about 20000/512=40 times. Suppose that there is a capacitive grating transducer 10 with a 5.08 mm grating spacing, and the position equivalent subdivision is 5.08/20000=0.000254 mm. The clock frequency is adjustable according to manufacturing needs, so that the position equivalent can be subdivided into several to hundreds of times of the original number, achieving the purpose of high resolution.

3.2) The processor 43 performs the following operations after receiving the interrupt flag signal:

321) reading the data in the first buffer, that is, the position equivalent of the gate of the capacitive grating transducer 10 within a grating spacing;

322) converting the data into an actual displacement value (also called absolute displacement value) of the gate of the capacitive grating transducer 10 within a grating spacing;

323) outputting the absolute displacement value to the display unit 45 and the serial interface 46 which are configured for data output.

The embodiment detailing the displacement measurement system is suitable for the situation where the displacement of the gate of the capacitive grating transducer 10 is restricted within one grating spacing.

In this embodiment, the first timer 41 produces an interrupt flag signal and transmits it to the processor 43 when receiving a rising edge of the ADSO signal. Those skilled in the art should understand that the timer 41 can also produce the interrupt flag signal and transmit it to the processor 43 when receiving a falling edge of the ADSO signal, or the rising or falling edge of the CLK512 signal. Therefore, in another embodiment, the processor 43 accesses the data written to the first buffer and converts the data into the absolute displacement value of the gate of the capacitive grating transducer 10 within a grating spacing when receiving an interrupt flag signal triggered by the falling edge of the ADSO signal, or the rising or falling edge of the CLK512 signal.

In the embodiment detailing the displacement measurement system, the first timer 41 counts upwards from zero according to the rising edges of the CLK512 signal and the ADSO signal. More precisely, the first timer 41 resets the count to zero when receiving the rising edge of the CLK512 signal, and writes the current count to the first buffer when receiving the rising edge of the ADSO signal. Referring to FIG. 2, in another embodiment, the first timer 41 can also count according to the falling edges of the CLK512 signal and the ADSO signal. More precisely, the first timer 41 resets the count to zero when receiving the falling edge of the CLK512 signal, and writes the current count to the first buffer when receiving the falling edge of the ADSO signal. Therefore, in this embodiment, the processor 43 accesses the data written to the first buffer and convert it into the absolute displacement value of the gate of the capacitive grating transducer 10 within a grating spacing when receiving an interrupt flag signal triggered by the rising/falling edge of the ADSO signal, or the rising/falling edge of the CLK512 signal.

In one embodiment of the displacement measurement system, the first timer 41 continuously counts at the clock frequency provided by the counting clock 42. In other embodiments, such a timer is provided to count at the clock frequency start from zero provided by the counting clock 42 when receiving a rising edge of the CLK512 signal, and to write a current count to the first buffer when receiving a rising edge of the ADSO signal (it will be understood that the counting process can also be obtained when receiving the falling edges of the CLK512 signal and the ADSO signal). The processor 43 accesses the data written to the buffer and convert it into the absolute displacement value of the gate of the capacitive grating transducer 10 within a grating spacing when receiving an interrupt flag signal triggered by the rising/falling edge of the ADSO signal, or the rising/falling edge of the CLK512 signal. Optionally, provided is a timer configured to count starting from zero when receiving the rising edge of the CLK512 signal, and to write the current time to the buffer when receiving the rising edge of the ADSO signal (or the timer is configured to count starting from zero when receiving the falling edge of the CLK512 signal, and to write the current time to the buffer when receiving the falling edge of the ADSO signal). The processor 43 accesses the data written the first buffer after receiving the interrupt flag signal, and combines the data and the clock frequency (e.g., multiplying the current time in the first buffer with the clock frequency) to obtain the displacement value of the gate of the capacitive grating transducer 10 within a grating spacing. The displacement value is then converted by the processor 43 into an absolute displacement value of the gate of the capacitive grating transducer 10 within a grating spacing. Certain embodiment of the disclosure relates to a timer that is configured to write the first current count to the first buffer when receiving the rising edge of the CLK512 signal, and to transmit the interrupt flag signal triggered by the CLK512 signal to the processor 43, allowing the processor 43 access the first data written the buffer. The timer also writes the second current count to the buffer when receiving the rising edge of the ADSO, and to transmit the interrupt flag signal triggered by the ADSO signal to the processor 43, allowing the processor 43 to access the second data written the buffer. The first data is subtracted from the second data to obtain the position equivalent of the gate of the capacitive grating transducer 10 within a grating spacing.

In the embodiment detailing the displacement measurement system, the first timer 41 comprises a buffer configured to store temporary data. However, the first timer 41 can also be used without use of a buffer. In another embodiment. The timer 41 resets the count to zero when receiving the rising edge of the CLK512 signal, and directly transmits the current count to the processor 43 when receiving the rising edge of the ADSO signal. The processor 43 converts the current count into an absolute displacement value of the gate of the capacitive grating transducer 10 within a grating spacing.

1 Those skilled in the art will understand that the single-chip microcomputer 40 comprises a random-access memory (RAM) configured to temporarily store the data that the processor 43 needs for running for the calculating process. For example, when receiving the interrupt flag signal, the processor 43 can store directly in the RAM 44 the data written to the buffer or the data transmitted from the timer 41, and process the data in the RAM 44 (For example, conversion of the data into an absolute displacement value of the gate of the capacitive grating transducer 10 within a grating spacing). In the case where an ARM microcontroller is employed, the data written to the buffer is directly stored in the RAM 44 through a direct memory access (DAM) channel, so that the processor 43 directly access the data most recently stored in the RAM 44 when receiving the interrupt flag signal.

In the case where the counting clock 42 outputs a relatively high clock frequency to the first timer 41 (that is, the position equivalent of the gate of the capacitive grating transducer 10 within a grating spacing is at a relatively high resolution), an unstable fluctuation may occur in the position equivalent obtained through timing and counting. To reduce the impact of such a fluctuation on the position equivalent, in a further embodiment, the processor 43 is configure to digitally filter the position equivalent of the gate of the first displacement sensor prior to data conversion (for example, 8 sets of data are combined to obtain an average value that is then subjected to digital filtering. More precisely, the average value is obtained by accessing 8 sets of the position equivalent of the gate of the capacitive grating transducer 10 within a grating spacing that are most recently stored in the RAM 44), thereby giving good stability data at a high resolution. The stability data is then converted into an absolute displacement value of the gate of the capacitive grating transducer 10 within a grating spacing.

In an additional embodiment, the processor 43 further executes the deviation correction for the absolute displacement value of the gate of the capacitive grating transducer 10 within a grating spacing. For example, a position calibration is determined by using segmented or point-by-point correction method of a standard measurement system through which the impact on the non-linearity error and manufacturing error are eliminated, thereby producing a high accurate measurement within a grating spacing. For example, when the resolution within a grating spacing is 20000, a grating spacing of 5.08 mm has a resolution of 0.000254 mm, i.e. 254 nm. The grating spacing of 5.08 mm is split into 8 equal lengths (0.635 mm) and used for interpolation and correction of linear coefficient. The estimating process is carried out with 4 times uncertain error. The displacement measurement device is controlled with an error range of ±1 µm that is 10 times better accuracy than the original data. The above deviation correction method is adapted to a wide range of micrometers.

The above embodiments detailing the displacement measurement system is suitable for measuring the absolute displacement value of the gate of the capacitive grating transducer 10 within a grating spacing. The following explains in more detail how to measure a total absolute displacement value of the gate of the capacitive grating transducer 10 exceeding one grating spacing.

Figure 6:
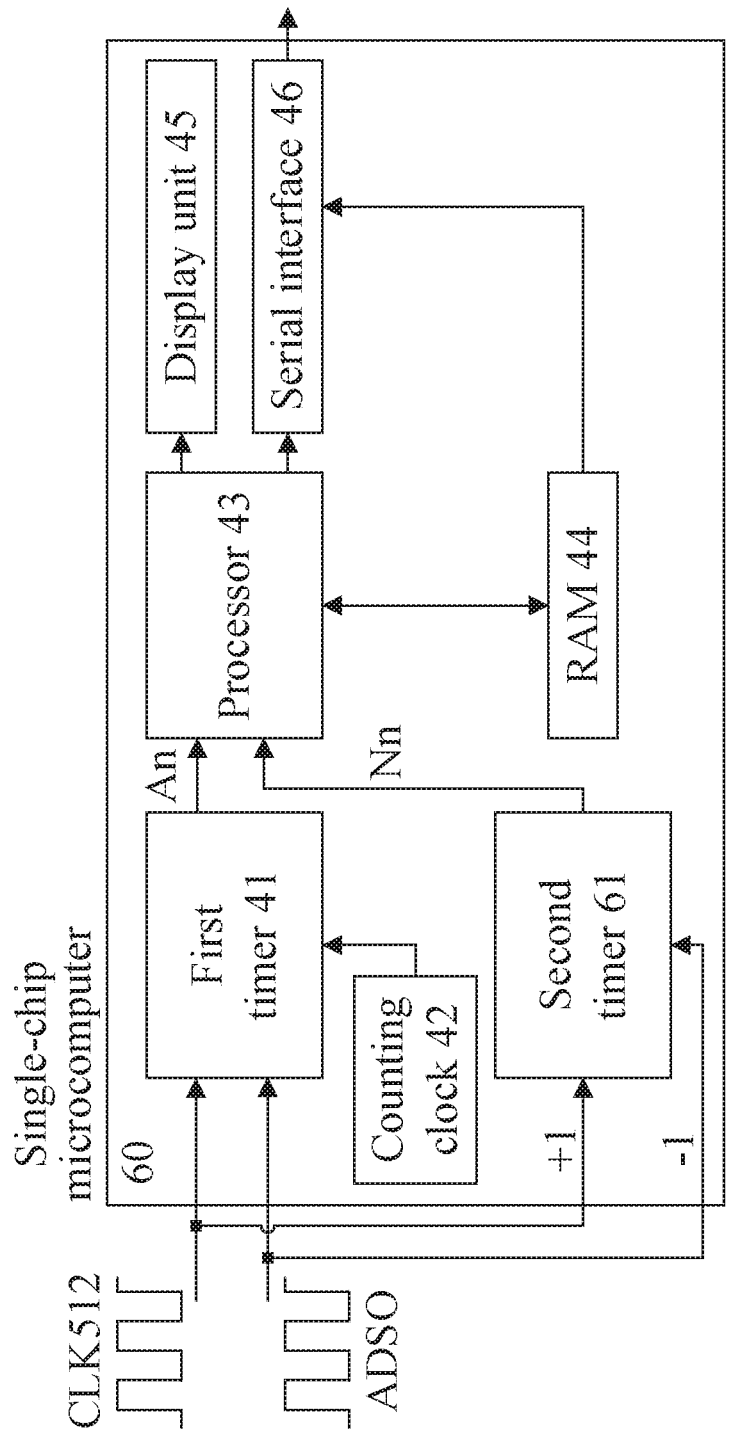
FIG. 6 is a block diagram of a one-chip computer of a displacement measurement device according to another embodiment of the disclosure.

In another embodiment discussed herein provides a displacement measurement system for a sensor device comprising a capacitive grating transducer. The displacement measurement system employs a periodic position measurement technology that combines with an incremented position measurement technology used to continuously monitor the change in the position of the gate of the capacitive grating transducer 10. The displacement measurement system is suitable for use in the situation where the displacement value of the gate of the capacitive grating transducer is greater than one grating spacing (that is, measurement of a large range of displacement value). The displacement measurement system comprises the ASIC chip 30 as shown in FIG. 3 and a single-chip microcomputer 60 as shown in FIG. 6.

The capacitive grating transducer 10, the ASIC chip, and the working principles thereof have been described herein with reference to FIG. 3, and are therefore not described in detail herein. With reference to FIG. 6, the single-chip microcomputer 60 comprises the first timer 41, a second timer 61, a counting clock 42, a processor 43, a RAM 44, a display unit 45, and a serial interface 46. The first timer 41 and the second timer 61 each comprises a buffer. The first timer 41 receives the ADSO signal from the capacitive signal processing circuit 24 on the ASIC chip, and the CLK512 signal from the clock divider circuit 22 on the ASIC chip. The first timer 41 is configured to time or count according to the CLK512 signal and the first ADSO signal at a clock frequency provided by the counting clock 42, thereby obtaining a position equivalent (by a method similar to that described with reference to FIG. 4) of the gate of the first displacement sensor 10 within a grating spacing. The second timer 61 is configured to receive the CLK512 signal and the ADSO signal, and perform an operation of adding 1 or subtracting 1 to obtain a number of the grating spacing of displacement of the gate of the capacitive grating transducer 10 according to the CLK512 signal and the ADSO signal. Based on the above described single-chip microcomputer 60, the processor 43 is configured to obtain a total absolute displacement equivalent of the gate of the capacitive grating transducer 10 according to the number of the grating spacing of the displacement of the gate of the capacitive grating transducer 10 and the a position equivalent of the gate of the capacitive grating transducer 10 within a grating spacing. According to one embodiment of the disclosure, the working principle of the single-chip microcomputer 60 is described in detail below:

1) The first timer 41 runs at the clock frequency provided by the counting clock 42, which is defined as a counting frequency (e.g. 6 MHz), and simultaneously receives the CLK512 signal and the ADSO signal. The first timer 41 resets the count to zero when receiving a rising edge of the CLK512 signal, writes the current count as a first data to a first buffer when receiving a rising edge of the ADSO signal, and produces and transmits an interrupt flag signal to the processor 43.

The second timer 61 is also configured to receive the CLK512 signal and the first ADSO signal, and to perform counting operation of adding 1 or subtracting 1 by judging whether the rising edge of the ADSO signal is monitored between the adjacent rising edges of the CLK512 signal, and calculating the number of the rising edges of the ADSO signal monitored (the gate of the capacitive grating transducer 10 moves across the grating spacing when no rising edges or two rising edges of the ADSO signal are monitored between the adjacent rising edges of the CLK512 signal). More precisely, the second timer 61 performs the operation of adding 1 when receiving the rising edge of the CLK512 signal, performs the operation of subtracting 1 when receiving the rising edge of the ADSO signal, and writes the count as a second data to the second buffer. The second data refers to the number of the grating spacing of the displacement of the gate of the capacitive sensor (where the second timer 61 is initialized to zero).

2) the processor 43 performs the following operations after receiving the interrupt flag signal (triggered by the rising edge of the ADSO signal):

210) accessing the first data written to the first buffer, where the first data refers to the position equivalent $A_n$ of the gate of the capacitive grating transducer 10; simultaneously accessing the second data written to the second buffer, where the second data refers to the number $N_n$ of the grating spacing of the displacement of the gate of the capacitive grating transducer 10;

220) obtain a total absolute displacement equivalent $L_n$ of the gate of the capacitive grating transducer 10 according to the following equation:

$$L_n = A_n + N_n \times M \qquad (1)$$

where M represents a resolution equivalent (M is 20000 when the clock frequency is 6 MHz) corresponding to each grating spacing of the capacitive grating transducer 10;

221) digitally filtering the total absolute displacement equivalent $L_n$ of the gate of the capacitive grating transducer 10;

230) converting the total absolute displacement equivalent $L_n$ of the gate of the capacitive grating transducer 10 into the total actual (absolute) displacement value of the gate of the capacitive grating transducer 10;

231) correcting the deviation of the total absolute displacement value of the gate of the capacitive grating transducer 10 within a grating spacing;

232) correcting the deviation of the absolute displacement value of the gate of the capacitive grating transducer 10 between the grating spacing; and 240) outputting the total absolute displacement value of the gate of the capacitive grating transducer 10 to the display unit 45 and the serial interface 46 for data output, thereby providing a high-resolution and high-accuracy measurement of a large range of displacement value.

In particularly, the first timer 41 and the second timer 61 respectively write the counts to their own buffer, so that the processor 43 simultaneously accesses and processes the data stored in the two above buffers when receiving the interrupt flag signal triggered by the rising edge of the ADSO signal. Those skilled in the art should be understood that when receiving the rising edge of the ADSO signal, the second timer 61 outputs the interrupt flag signal to the processor 43 in addition to performing the operations of subtracting 1 and writing the current count to the corresponding buffer. Therefore, the processor 43 accesses and processes the data written to the two buffers when receiving the interrupt flag signal triggered by the rising edge of the ADSO signal from the first timer 41 or the second timer 61.

In another embodiment, the above-described process can also be performed with the falling edge of the signal. The first timer 41 is configured to reset the count to zero, and perform the operation of adding 1 when receiving the falling edge of the CLK512 signal. The current count is written to the first buffer and the operation of subtracting 1 is performed when the first timer 41 receives the falling edge of the ADSO signal. The first timer 41, the second timer 61, or a combination thereof transmits the interrupt flag signal to the processor 43 when the falling edge of the ADSO signal is monitored. The processor simultaneously accesses and processes the data written to the two above buffers when receiving the interrupt flag signal triggered by the rising edge of the ADSO signal.

In another embodiment, the first timer 41 and the second timer 61 can also be used without use of a buffer, that is, the first timer 41 and the second timer 61 directly transmit the current count to the processor for data analysis 43 when the rising edge of the ADSO signal is monitored. In another embodiment, the processor 43 is configured to store in the RAM 44 the data written to the first buffer and the second buffer when the interrupt flag signal is monitored, or to directly store in the RAM 44 the data written to the first timer 41 and the second timer 61, and to perform data analysis to obtain the total absolute displacement value of the gate of the capacitive grating transducer 10. In the case where the single-chip microcomputer is employed, the data written to the first buffer and the second buffer is directly stored in the RAM 44 through the DAM channel, thereby allowing the processor 43 to access and process the data (refers to the position equivalent of the gate of the capacitive grating transducer 10 originating from the first timer 41, and the number of the grating spacing of displacement of the gate of the capacitive grating transducer 10 originating from the second timer 61) most recently stored in the RAM 44 when receiving the interrupt flag signal.

Figure 7:
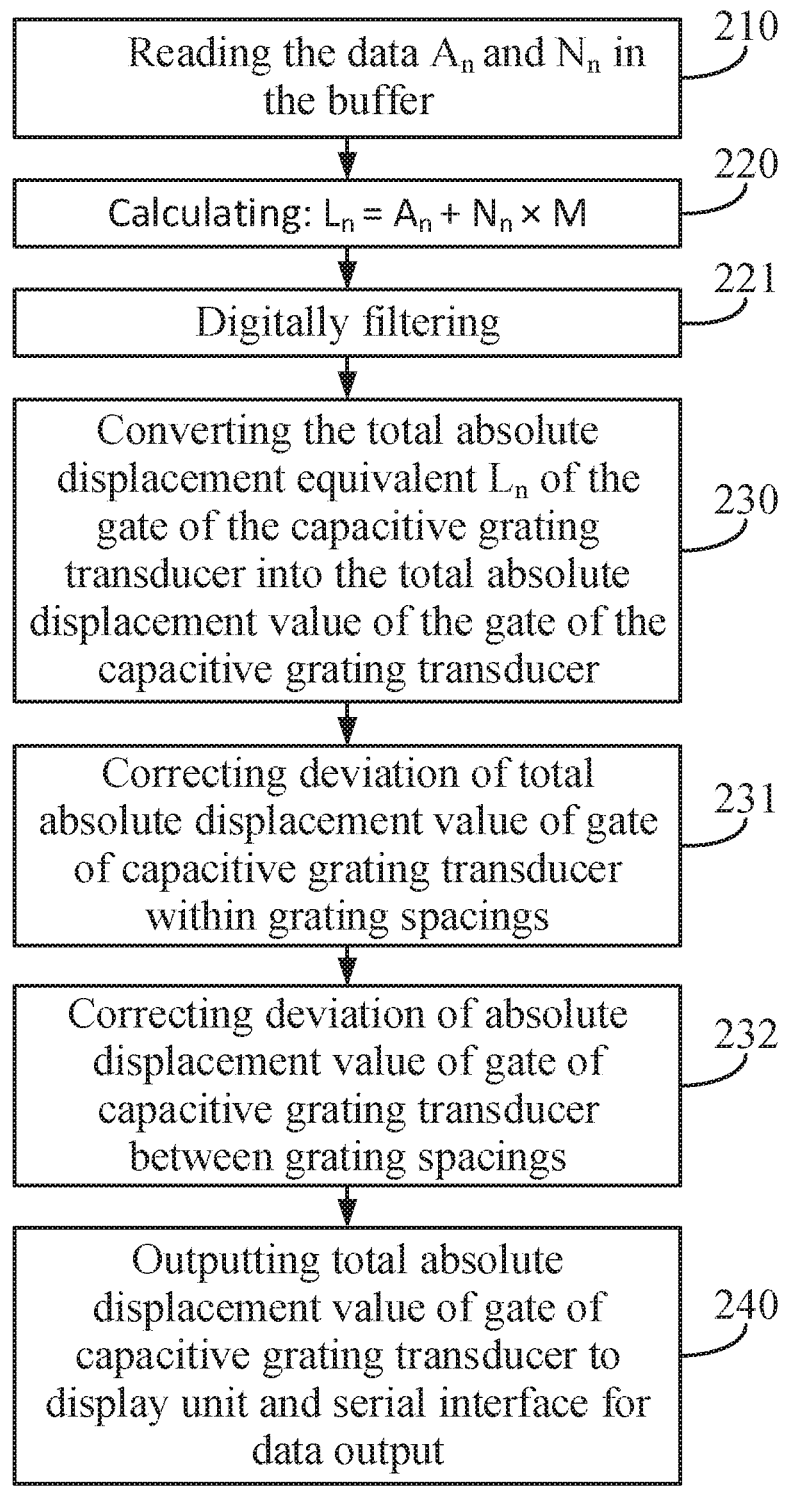
FIG. 7 is a flow chart of a data processing program performed by a CPU of a single chip microcomputer according to another embodiment of the disclosure.

In another embodiment, referring to FIG. 7, prior to the conversion process in the 230), the processor 43 is further configured to digitally filter the absolute displacement value of the gate of the capacitive grating transducer 10, thereby giving good stability data (with reference to step 221). Following the 230), the processor 43 is further configured to correct a deviation of the total absolute displacement value of the gate of the capacitive grating transducer 10 within a grating spacing (with reference to step 231), and to correct a deviation of the absolute displacement value of the gate of the capacitive grating transducer 10 between the grating spacing (with reference to step 232). The deviation between the grating spacing is corrected by a calibration method where the grating period is viewed as a calibration equivalent. The periodical signals having the same position within a grating spacing are corrected for more accurate gate fabrication without error.

In the above-mentioned embodiment (suitable for use in the situation where the total absolute displacement value of the gate of the capacitive grating transducer 10 is greater than one grating spacing), the second timer is configured to count the number of the grating spacing of displacement of the gate of the capacitive grating transducer 10. Those skilled in the art will understand that the counting process can also be performed by any suitable methods not included herein. For example, in yet another embodiment, two counters are respectively configured to receive the CLK512 signal and the ADSO signal, in which one of the timers performs the operation of adding 1 and writes the count to the corresponding buffer when receiving the rising edge of the CLK512 signal. Another timer performs the operation of adding 1 and writes the count to the corresponding buffer when receiving the rising edge of the ADSO signal. Also, the rising edge of the ADSO signal triggers the processor 43 to access and compare the two counts respectively written to the two buffers. When the count for the rising edge of the CLK512 signal is greater than that for the rising edge of the ADSO signal by 1, indicating that there is no rising edge of the ADSO signal monitored between the adjacent rising edges of the CLK512 signal (implying that the processor 43 can perform the operation of adding 1 for the current number of the grating spacing of displacement of the gate of the capacitive grating transducer 10). When the rising edge of the ADSO signal is greater than that for the rising edge of the CLK512 signal by 1, indicating that there are two rising edges of the ADSO signal monitored between the adjacent rising edges of the CLK512 signal (implying the processor 43 can perform the operation of subtracting 1 for the current number of the grating spacing of displacement of the gate of the capacitive grating transducer 10, wherein the number of the grating spacing of displacement of the gate is initialized to zero).

In one embodiment, the disclosure further provides a displacement measurement system for sensor devices including capacitive grating transducer, thereby producing a high-resolution, high-accuracy measurement of a large range of displacement value. The displacement measurement system combines the conventional ASIC chip with the timer (or counter) function of the single-chip microcomputer to obtain a total absolute displacement value of the gate of the capacitive grating transducer 10. The displacement measurement system is suitable for measuring actual displacement of a capacitive grating transducer that has been stationary.

Figure 8:
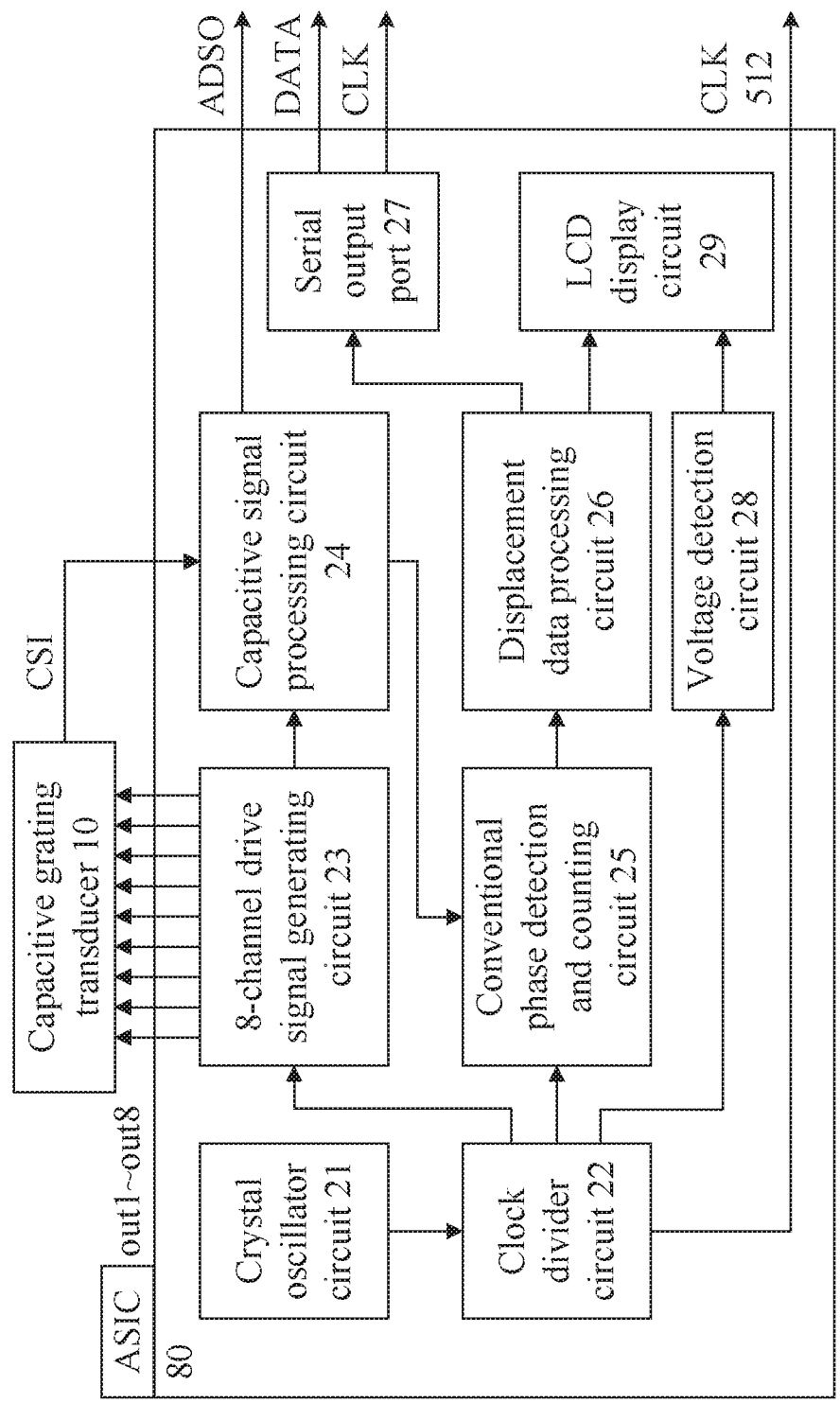
FIG. 8 is a block diagram of an ASIC chip of a displacement measurement device comprising a capacitive grating transducer according to another embodiment of the disclosure.
Figure 9:
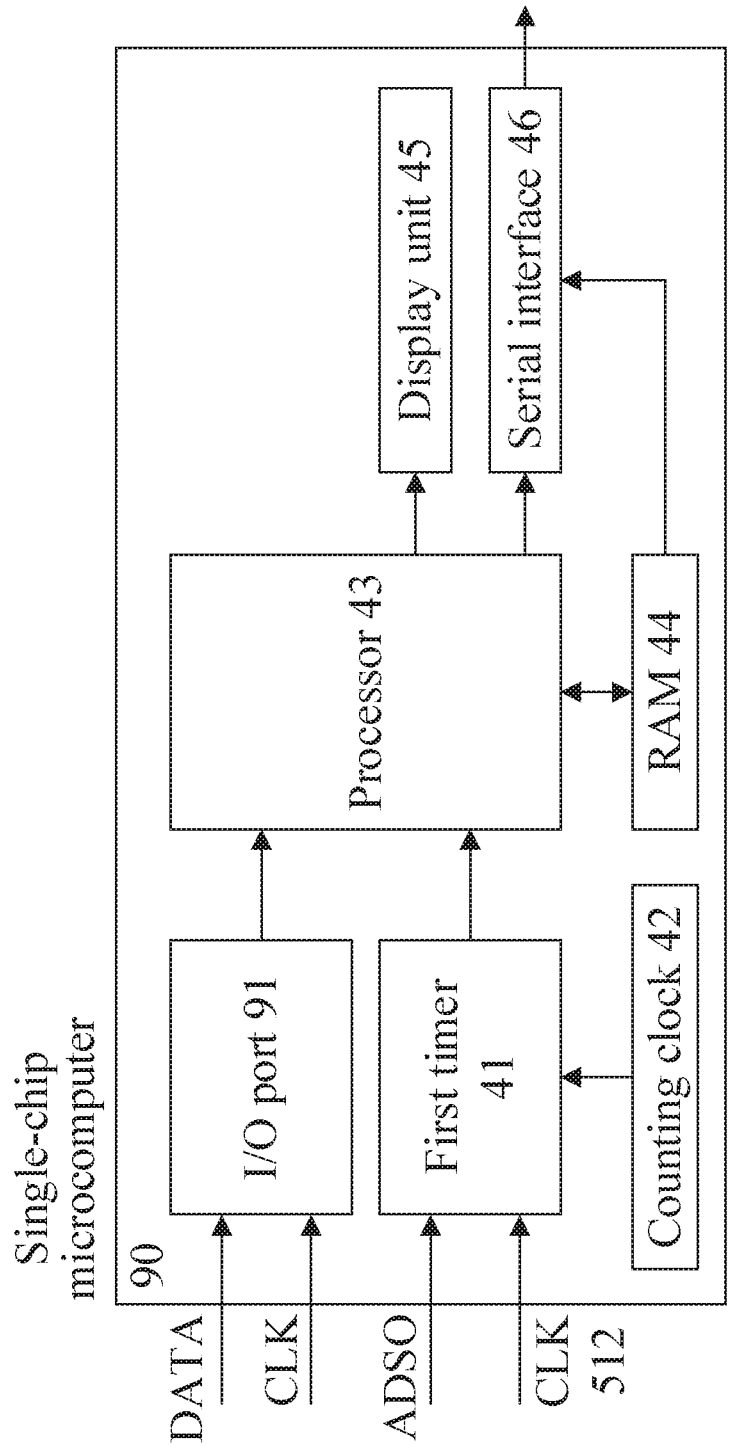
FIG. 9 is a block diagram of a single chip microcomputer of a displacement measurement device according to another embodiment of the disclosure.

Referring to FIG. 8, the ASIC chip 80 is similar to the conventional ASIC chip 20 as described in FIG. 8 (comprising the crystal oscillator circuit 21, the phase detection and counting circuit 25, the displacement data processing circuit 26, the serial output port 27, etc.) The following mainly describes differences between the ASIC chip 80 and the conventional ASIC chip 20. As shown in FIG. 8, the capacitive signal processing circuit 24 generates and transmits the ADSO signal to the phase detection and counting circuit 25 on the ASIC chip 80, and to the single-chip microcomputer 90 as shown in FIG. 9. The clock frequency divider circuit 22 outputs the CLK512 signal with the same period and phase as the 8-channel drive signal to the single-chip microcomputer 90. Referring to FIG. 9, the single-chip microcomputer 90 is configured to receive the signals output from the serial output port 27 of the ASIC chip 80, including the DATA signal and the CLK signal. The DATA signal refers to the data signal comprising the information (also called displacement information herein) on the total absolute displacement value of the gate of the capacitive grating transducer 10 which is generated by the ASIC chip with reference to the conventional methods (for treatment of ADSO signal by phase detection, counting, data processing, etc.). The CLK512 signal refers to a clock synchronization signal. The conventional data acquisition method is a process of collecting the DATA signal on the falling edge of the narrow pulse of the CLK signal.

Compared with the components described in FIG. 4, the single-chip microcomputer 90 in FIG. 9 further comprises an I/O port 91 configured to receive the DATA signal and the CLK signal from the serial output port 27 of the ASIC chip 80. More precisely, described below are working principles of the single-chip microcomputer 90 in FIG. 9 in accordance with the embodiment of the disclosure:

1) The single-chip microcomputer 90 is configured to receive the CLK signal and the DATA signal from the serial output port 27 through the I/O port 91. The first timer 41 disposed in the single-chip microcomputer 90 is configured to receive the ADSO signal and the CLK512 signal with the same method mentioned above for obtaining the position equivalent of the gate of the capacitive grating transducer 10. The first timer 41 is configured to time or count according to the CLK512 signal and the ADSO signal at a clock frequency (i.e. 6 MHz) provided by the counting clock 42. For example, the first timer 41 counts at the clock frequency starting from zero provided by the counting clock 42 when receiving the rising edge of the CLK512 signal, and writes the current count (i.e., the position equivalent of the gate of the capacitive grating transducer 10) to the buffer when receiving the rising edge of the ADSO signal (The working principle of the first timer 41 in FIG. 9 is the same as that in FIGS. 4 and 6);

2) obtaining the number of the grating spacing of displacement of the gate of the capacitive grating transducer 10 according to the CLK signal and the DATA signal which are transmitted through the I/O port 91; accessing and processing the data written to the first buffer when receiving an interrupt flag signal from the first timer 41, thereby obtaining a position equivalent of the gate of the capacitive grating transducer 10 within a grating spacing; obtaining an absolute displacement value of the gate of the capacitive grating transducer 10 within a grating spacing according to the number of the grating spacing of displacement of the gate of the capacitive grating transducer 10 and the a position equivalent of the gate of the capacitive grating transducer 10. As discussed in detail in one embodiment, the working principle of the processor 43 includes the following:

21) accessing the DATA signal and identifying whether the DATA signal is in high-level or low-level state according to the interrupt signal triggered by the rising edge or the falling edge of the CLK signal, thereby obtaining the displacement information (the multi-digit binary numbers represented by 0 and 1, where the low bit is in front, and the bits starting from the $12^{th}$ represent the number of the grating spacing of displacement of the gate of the capacitive grating transducer 10) contained in the DATA signal; extracting the number of the grating spacing of displacement of the gate of the capacitive grating transducer 10 from the displacement information; and obtaining a position equivalent of the gate of the capacitive grating transducer 10 within a grating spacing according to the first data written to the first buffer when the interrupt flag signal from the first timer 41 is monitored;

22) obtaining a total absolute displacement value of the gate of the capacitive grating transducer 10 according to the equation (1), comprising the steps of: multiplying the number of the grating spacing of displacement of the gate extracted from the DATA signal with the resolution equivalent (e.g. 20000) corresponding to each grating spacing of the capacitive grating transducer 10; adding the result of multiplication to the position equivalent of the gate of the capacitive grating transducer 10 within a grating spacing to obtain the total absolute displacement value of the gate of the capacitive grating transducer 10;

23) converting the total absolute displacement equivalent of the gate of the capacitive grating transducer 10 into a total absolute displacement value of the gate of the capacitive grating transducer 10;

24) outputting the total absolute displacement value of the gate of the capacitive grating transducer 10 to the display unit 45 and the serial interface 46 for data output, thereby providing a high-resolution and high-accuracy measurement of a large range of displacement value.

In the embodiment, as described above, the first timer 41 also can used without use of a buffer, and the RAM 44 is configured to temporarily store the data written to the buffer and the data generated by the processor 44; the processor 43 is configure to digitally filter the position equivalent of the gate of the first displacement sensor prior to data conversion (that is, converting the total absolute displacement equivalent to the total absolute displacement value); and after converting the data, the processor 43 corrects a deviation of the absolute displacement value of the gate of the capacitive grating transducer 10 within a grating spacing and between the grating spacing.

The disclosure also provides a displacement measurement system for displacement sensor for high-resolution and high-accuracy measurement of a large range of angular displacement value. A sensor device comprising two capacitive grating transducers will be described in detail with respect to FIGS. 10 and 11.

In the embodiment, the sensor device comprises two capacitive grating transducers: a coarse-divided capacitive grating transducer 11, and a sub-divided capacitive grating transducer 12 (the combination method thereof is described in detail in China Patent CN200710050658.3). The coarse-divided capacitive grating transducer 11 has a grating spacing in one complete circle round (that is, on grating spacing corresponds to a full scale of a circle of 360°). The sub-divided capacitive grating transducer 12 has multiple grating spacings in one complete circle round (e. g. 20 grating spacing).

Figure 10:
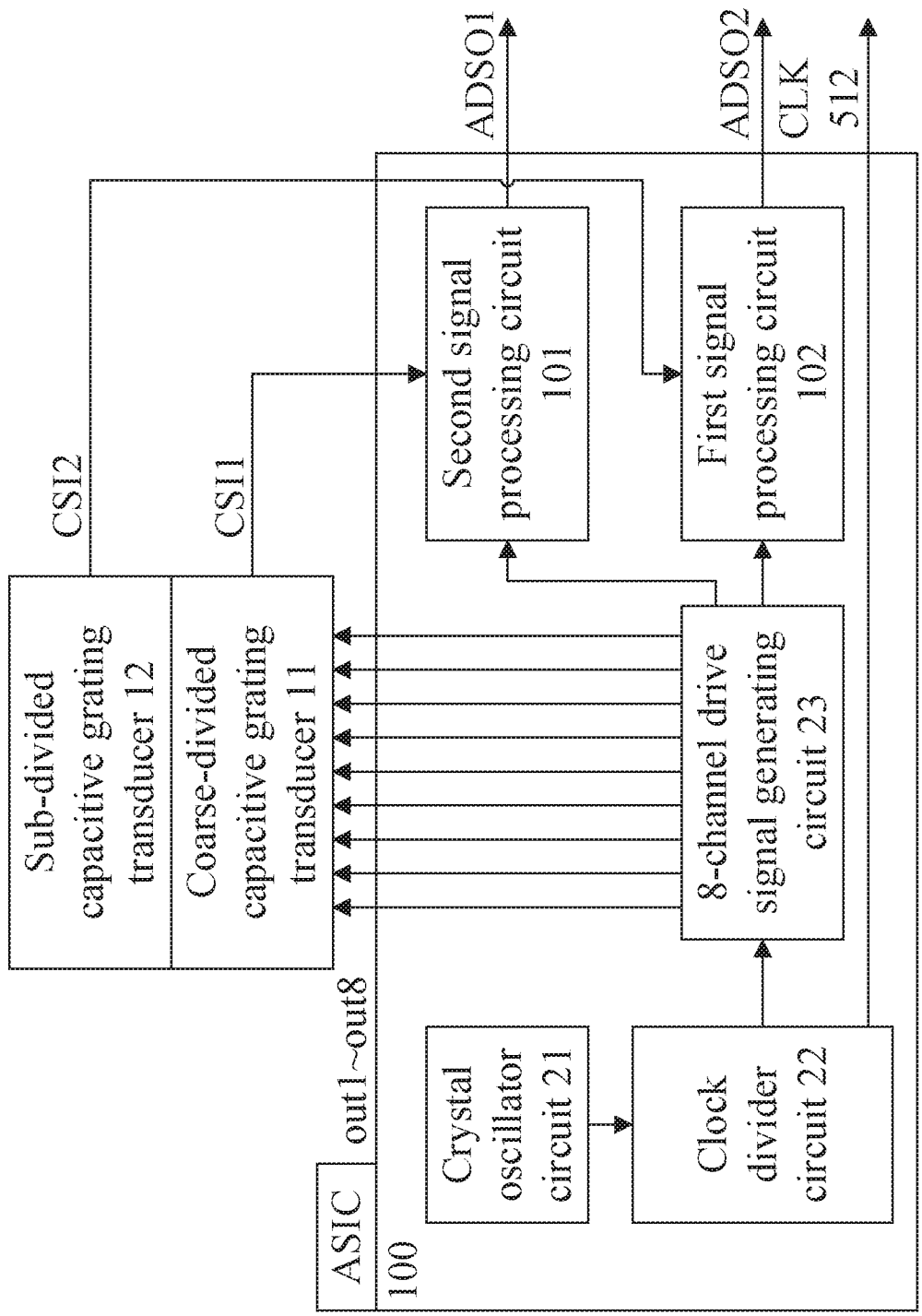
FIG. 10 is a block diagram of an ASIC chip of a displacement measurement device comprising a coarse-divided and sub-divided capacitive grating transducer according to one embodiment of the disclosure.

In accordance with the embodiment, referring to FIG. 10, the ASIC chip 100 comprises the crystal oscillator circuit 21, the clock divider circuit 22, the 8-channel drive signal generating circuit 23 (Note that the 8-channel signal is configured to drive the coarse-divided capacitive grating transducer 11 and a sub-divided capacitive grating transducer 12), a first signal processing circuit 102, and a second signal processing circuit 101. The first signal processing circuit 102 is configured to receive a first output signal CSI1 from the coarse-divided capacitive grating transducer 11, and to output an ADSO1 signal to a single-chip microcomputer 110 as described in FIG. 11. The second signal processing circuit 101 is configured to receive a second output signal CSI2 from the sub-divided capacitive grating transducer 12, and to output an ADSO2 signal to the single-chip microcomputer 110. The clock divider circuit 22 outputs the CLK512 signal with the same period and phase as the 8-channel drive signal to the single-chip microcomputer 110.

Figure 11:
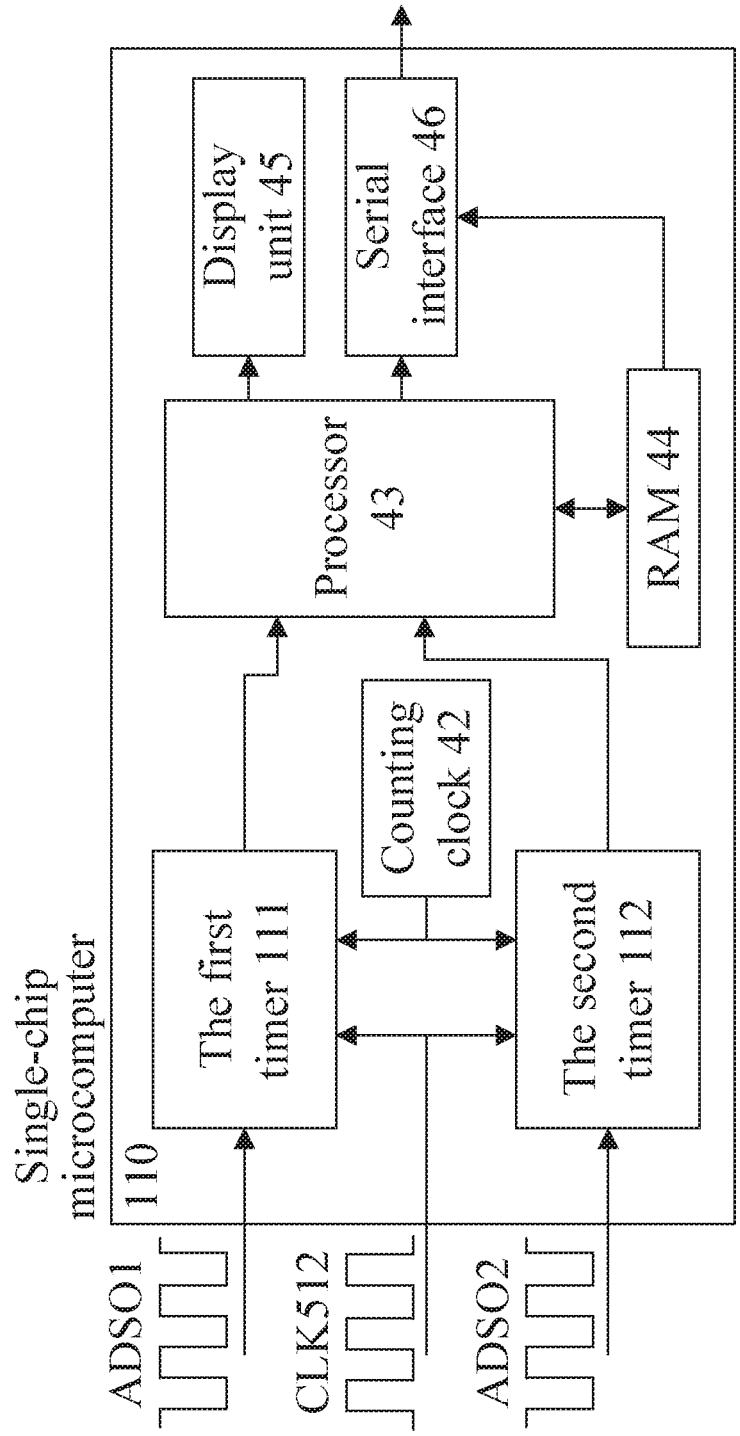
FIG. 11 is a block diagram of a one-chip computer of a displacement measurement device according to still another embodiment of the disclosure.

Referring to FIG. 11, the single-chip microcomputer 110 comprises two identical timers 111, 112. The first timer 111 is configured to receive the ADSO signal from the second signal processing circuit 101 and the CLK512 signal from the clock divider circuit 22. The second timer 112 is configured to receive the ADSO signal from the first signal processing circuit 102 and the CLK512 signal from the clock divider circuit 22. In accordance with one embodiment of the disclosure, the working principle of the single-chip microcomputer 110 includes the following:

1) the method for obtaining the position equivalent of the gate of the capacitive grating transducer 10 is the same as that described above. The first timer 111 is configured to time or count according to the CLK512 signal and the ADSO1 signal at a clock frequency (e.g. 6 MHz) provided by the counting clock 42, thereby obtaining a first position equivalent of the gate of the coarse-divided capacitive grating transducer 11. The first timer 112 employs the clock frequency provided by the counting clock 42 as a counting frequency and counts at the counting frequency according to the ADSO2 signal and the CLK512 signal, thereby obtaining a second position equivalent of the gate of the sub-divided capacitive grating transducer 12. According to one embodiment of the disclosure, the first timer 111 comprises a buffer. The first timer 111 is configured to time or count at the clock frequency starting from zero provided by the counting clock 42 when receiving a rising edge of the CLK512 signal, and writes the first current count to the corresponding buffer when receiving a rising edge of the first ADSO1 signal. The first current count refers to the first position equivalent of the gate of the coarse-divided capacitive grating transducer 11 within a grating spacing. The second timer 112 is configured to time or count at the clock frequency starting from zero provided by the counting clock 42 when receiving a rising edge of the CLK512 signal, and writes the second current count to the corresponding buffer when receiving a rising edge of the first ADSO2 signal. The second current count refers to the second position equivalent of the gate of the sub-divided capacitive grating transducer 12 within a grating spacing. The first timer 111 or the second timer 112 transmits the interrupt flag signal to the processor 43 when receiving the CLK512 signal, allowing the processor 43 to synchronously access the data written to the two buffers;

2) the processor 43 performs the following operations after receiving the interrupt flag signal triggered by the rising edge of the CLK512 signal from the first timer 111 or the second timer 112:

21) the processor 43 accesses the first data written to the first buffer, and accesses the second data written to the second buffer. The first data refers to the position equivalent of the gate of the coarse-divided capacitive grating transducer 11 within a grating spacing. The second data refers to the position equivalent of the gate of the sub-divided capacitive grating transducer 12 within a grating spacing;

22) determining the number of the grating spacing of the displacement of the gate of the sub-divided capacitive grating transducer 12 according to the position equivalent of the gate of the coarse-divided capacitive grating transducer 11 within a grating spacing;

for example, suppose that the resolution equivalent corresponding to each grating spacing is 20000, the corresponding data of the coarse-divided capacitive grating transducer 11 in one complete circle round is obtained using the following equation: 20000/20=1000; where 0-999 corresponds to the $0^{th}$ position (the number of the grating spacing of the gate is zero) of the grating spacing of the sub-divided capacitive grating transducer 12, and 1000-1999 corresponds to the $1^{st}$ position of the grating spacing of the sub-divided capacitive grating transducer 12, and so on. Therefore, the number of the grating spacing of the displacement of the gate of the sub-divided capacitive grating transducer 12 can be determined according to the position equivalent of the gate of the coarse-divided capacitive grating transducer 11 within a grating spacing;

23) referring to the equation (1), multiplying the number of the grating spacing of displacement of the gate obtained in 22) with the resolution equivalent (e.g. 20000) corresponding to each grating spacing of the sub-divided capacitive grating transducer 12; adding the result of multiplication to the position equivalent of the gate of the sub-divided capacitive grating transducer 12 within a grating spacing to obtain the total absolute displacement value of the gate of the capacitive grating transducer 10;

24) converting the total absolute position equivalent of the gate of the sub-divided capacitive grating transducer 12 in the circle range (that is, multiplying by the equivalent coefficient 18/20000) to obtain the total absolute displacement value (also called the actual position angle value) of the gate of the sub-divided capacitive grating transducer 12.

25) outputting the total absolute displacement value of the gate of the sub-divided capacitive grating transducer 12 to the display unit 45 and the serial interface 46 for data output.

The first timer 111 and the second timer 112 each own their respective buffer, but other embodiments can also be implemented without use of a buffer. In the case where the buffer is not employed in the timer, when receiving the rising edge of the ADSO1 signal, the first timer 111 transmits the first current count to the processor 43 and the first data is stored in the RAM 44 by a process executed on the processor 43; when receiving rising edge of the ADSO2 signal, the second timer 112 transmits the second current count to the processor 43 and the second data is stored in the RAM 44 by the process executed on the processor 43. The RAM 44 reads the two data for subsequent analysis when the processor 43 receives the interrupt flag signal triggered by the CLK512 signal from the first timer 111 or the second timer 112. In the case where an ARM microcontroller is used, the timers 111, 112 transfer the data from the buffer to the RAM 44 without processor 43 intervention. The processor 43 is further configured to access and process the data stored in the RAM 44 when receiving the interrupt flag signal. It will be understood by one skilled in the art that in another embodiment, the timers 111, 112 reset the count to zero when receiving the falling edge of the CLK512 signal, write the current counts to the their respective buffers when receiving the falling edges of the ADSO1 signal and the ADSO2 signal, and transmits the interrupt flag signal to the processor 43 when receiving the rising edge (or the falling edge) of the CLK512 signal.

In another embodiment, the first timer 111 can also transmits the interrupt flag signal to the processor 43 when receiving the rising edge of the ADSO1 signal, and the second timer 112 transmits the interrupt flag signal to the processor 43 when receiving the rising edge of the ADSO2 signal. In a further embodiment, the processor 43 is configure to digitally filter the total absolute position equivalent of the gate of the sub-divided capacitive grating transducer 12 within a circle range prior to data conversion. After converting the data, the processor 43 corrects a deviation of the total absolute displacement value of the gate within a grating spacing and between the grating spacing.

As used herein, the coarse-divided capacitive grating transducer 11 has only one grating spacing in one complete circle round, and the sub-divided capacitive grating transducer 12 has multiple grating spacings in one complete circle round, indicating that the displacement measurement system is operable to perform the angular displacement measurement in one complete circle round. It will be understood that the displacement measurement system is also suitable for sector angle measurement where the sub-divided capacitive grating transducer 12 is required to have N grating spacings within a grating spacing of the coarse-divided capacitive grating transducer 11 (wherein N is an integer and N≥2). The displacement measurement system is suitable for measuring absolute length, in addition to angular measurement.

As described above, the disclosure provides three high-resolution and high-accuracy displacement measurement systems of a large range of displacement value. The displacement measurement system shown in FIGS. 3 and 6 is operable without use of conventional phase detection and counting circuit 25, displacement data processing circuit 26, etc., thereby permitting the system to occupy a small space. Also, the displacement measurement system is operable in the situation where the sensor device has been stationary. The displacement measurement system shown in FIGS. 8 and 9 may be implemented on the existing ASIC chips, which makes manufacturing easier but requires larger space than other systems of the same type. The displacement measurement system is mainly suitable for measuring the displacement of the gate of a sensor device that has been in a static state. The displacement measurement system shown in FIGS. 10 and 11 is suitable for measuring angular displacement and linear displacement no matter whether the sensor device is stationary or moving. The three displacement measurement systems provided herein retain the technology for large-scale production of conventional phase-detection capacitive grating transducer, which is low cost for displacement measurement with high resolution and high accuracy. It will be understood by those skilled in the art that, in still other embodiment, the counting frequency can be provided by an external clock of the single-chip microcomputer in addition to timing or counting at the frequency provided by the inner clock of the single-chip microcomputer. The ASIC chip and the sing-chip microcomputer are described separately above, but it should be noted that in still other embodiment, the ASCI chip may be integrated onto the single-chip microcomputer, or the single-chip microcomputer may be integrated onto the ASIC chip, or the ASIC chip and the single-chip microcomputer are integrated onto the same chip or multiple chips.

Those skilled in the art should understand that in addition to single-chip microcomputers, other digital processing devices capable of providing computing functions can also be used in implementing the disclosure.

Those skilled in the art should understand that the displacement measurement systems provided herein is also suitable for use in other displacement sensor in addition to capacitive grating transducer, such as capacitive transducers, inductosyns, and grating sensors. The working principle of the displacement sensors is similar to that described below for the capacitive grating transducer: Driving signal is a signal with a periodically changing signal. The displacement sensor couples and modulates the drive signal so as to generate an output signal whose time changing period corresponds to the spatial period of the change in the grating spacing of the displacement sensor. A phase detector receives the output signal and outputs a square wave signal that corresponds to the position of the grating spacing of the gate and has the same period and different phase with respect to the initial drive signal.

Although the disclosure is described above by taking a capacitive gate sensor that receives multi-channel (usually 8-channel) signal as an example, but it should be noted that in this case, the drive signal generating circuit 23 provides one-channel drive signal, the clock frequency divider circuit 22 provides the CLK512 signal which has the same period and phase as the one-channel drive signal. In a further embodiment, the period or phase of the CLK512 signal is not completely the same as that of the one-channel drive signal. For example, the two periods have a linear relationship, and the two phases are opposites or have other corresponding relationships.

It should be noted that some exemplary methods of the displacement measurement system are described further in the flowcharts below. Although the flowcharts may describe the operations as a sequential process, many of the operations can be performed in parallel or concurrently. Also, the order of the operations can be rearranged. The process may be terminated after the execution is naturally completed, but may also have additional steps not included in the flowcharts or in the embodiments.

The above method can be implemented in hardware, software, firmware, middleware, pseudo-code, hardware description language, or any combination thereof. When implemented in software, firmware, middleware, or pseudo-code, the program code or code segments for implementation of task can be stored in a computer-readable medium, such as a storage medium, and the processor can perform the task.

Those skilled in the art should understand that the exemplary embodiments implemented in software are usually encoded on some form of program storage medium or implemented on some type of transmission medium. The program storage medium may be any non-transitory storage medium, such as a magnetic disk (for example, a floppy disk or a hard disk) or an optical disk (for example, a compact disk read-only memory or "CD ROM"), and may be a read-only or randomly accessed memory. The transmission medium may be twisted pair, coaxial cable, optical fiber, or some other suitable transmission medium known in the art.

It will be obvious to those skilled in the art that changes and modifications may be made, and therefore, the aim in the appended claims is to cover all such changes and modifications.

What is claimed is:

1. A displacement measurement device for a sensing device, the sensing device comprising a first displacement sensor, and the displacement measurement device comprising:
a drive signal generating circuit configured to output a drive signal to the first displacement sensor;
a first signal processing circuit configured to receive a signal from the first displacement sensor and output a first ADSO signal; and
a computing device comprising a first timer;
wherein:
the first timer is configured to receive a CLK512 signal and the first ADSO signal, and time or count according to the CLK512 signal and the first ADSO signal;
the CLK512 signal is a square wave signal related to a period and phase of the drive signal; and
the device further comprises a clock frequency divider circuit configured to output a clock signal and the CLK512 signal to the drive signal generating circuit.

2. The device of claim 1, wherein the computing device further comprises a processor configured to convert data obtained by the first timer through timing or counting into an absolute displacement value of a gate of the first displacement sensor within a grating spacing.

3. The device of claim 2, further comprising a counting clock, wherein the first timer is configured to time or count according to the CLK512 signal and the first ADSO signal at a clock frequency provided by the counting clock.

4. The device of claim 3, wherein the first timer is configured to time or count at the clock frequency starting from zero provided by the counting clock when a rising edge of the CLK512 signal is monitored, and to transmit a current time or current count to the processor when a rising edge of the first ADSO signal is monitored.

5. The device of claim 3, wherein the first timer further comprises a first buffer; the first timer is configured to time or count at the clock frequency starting from zero provided by the counting clock when a rising edge of the CLK512 signal is monitored, and to write a current time or current count to the first buffer when a rising edge of the first ADSO signal is monitored; and the processor is configured to read data in the first buffer when receiving an interrupt flag signal triggered by the first ADSO signal or the CLK512 signal.

6. The device of claim 3, wherein the processor is configured to obtain a position equivalent of the gate of the first displacement sensor within a grating spacing according to the data obtained by the first timer through timing and the clock frequency provided by the counting clock, and convert the position equivalent of the gate of the first displacement sensor within a grating spacing to an absolute displacement value of the gate of the first displacement sensor within a grating spacing.

7. The device of claim 6, wherein the processor is further configured to digitally filter the position equivalent of the gate of the first displacement sensor within a grating spacing, and to correct a deviation of the absolute displacement value of the gate of the first displacement sensor within a grating spacing.

8. The device of claim 3, wherein the counting clock is disposed in the computing device.

9. The device of claim 2, wherein the computing device further comprises a second timer configured to receive the CLK512 signal and the first ADSO signal, and to count a number of the grating spacing of displacement of the gate of the first displacement sensor according to the CLK512 signal and the first ADSO signal; and the processor is further configured to obtain a total absolute displacement value of the gate of the first displacement sensor according to the data obtained by the second timer through counting and the data obtained by the first timer through timing or counting.

10. The device of claim 9, wherein the processor is configured to obtain a total absolute displacement equivalent $L_n$ of the gate of the first displacement sensor according to the following equation: $L_n = A_n + N_n \times M$, $A_n$ represents the data obtained by the first timer through counting, $N_n$ represents the data obtained by the second timer through counting, and M represents a resolution equivalent corresponding to each grating spacing of the first displacement sensor, and also configured to convert the total absolute displacement equivalent $L_n$ of the gate of the first displacement sensor into the total absolute displacement value of the gate of the first displacement sensor.

11. The device of claim 2, wherein:
the drive signal generating circuit and the first signal processing circuit are integrated on a chip, and the chip further comprises:
a phase detection and counting circuit configured to receive the first ADSO signal, and
a serial output port configured to output a CLK signal and a DATA signal comprising displacement information of the gate of the first displacement sensor;
the computing device is further configured to receive the CLK signal and the DATA signal; and
the processor is further configured to obtain the number of the grating spacing of the displacement of the gate of the first displacement sensor according to the received CLK signal and the DATA signal, and to obtain the total absolute displacement value of the gate of the first displacement sensor according to the number of the grating spacing of the displacement of the gate of the first displacement sensor and the data obtained by the first timer by timing or counting.

12. The device of claim 11, wherein the processor is configured to obtain a total absolute displacement equivalent of the gate of the first displacement sensor according to the number of the grating spacing of the displacement of the gate of the first displacement sensor and the data obtained by the first timer through timing or counting, and to convert the total absolute displacement equivalent of the gate of the first displacement sensor into a total absolute displacement value of the gate of the sensor.

13. The device of claim 3, wherein the sensing device further comprises a second displacement sensor; the first displacement sensor comprises a plurality of grating spacings within one grating spacing of the second displacement sensor; the drive signal generating circuit is further configured to output the drive signal to the second displacement sensor; and the displacement measurement device further comprises a second signal processing circuit configured to receive a signal from the second displacement sensor and output a second ADSO signal; the computing device further comprises a third timer configured to receive the second ADSO signal and the CLK512 signal, and to time or count according to the CLK512 signal and the second ADSO signal at the clock frequency provided by the counting clock;

the processor is further configured to determine the number of the grating spacing of the displacement of the gate of the first displacement sensor according to the data obtained by timing or counting of the third timer, and to obtain a total absolute displacement value of the gate of the first displacement sensor according to the number of the grating spacing of the displacement of the gate of the first displacement sensor and the data obtained by timing or counting of the first timer.

14. The device of claim 13, wherein the third timer is configured to time or count at the clock frequency starting from zero provided by the counting clock when a rising edge of the CLK512 signal is monitored, and to transmit a current time or current count to the processor when a rising edge of the first ADSO signal is monitored, or record the current time or current count.

15. The device of claim 13, wherein the first displacement sensor and the second displacement sensor are a capacitive grating transducer.

16. The device of claim 1, wherein the CLK512 signal is a square wave signal with the same period and phase as the drive signal.

17. The device of claim 1, wherein the computing device, the drive signal generating circuit, and the first signal processing circuit are integrated on a chip.

18. A method for displacement measurement for a sensing device, the sensing device comprising a first displacement sensor, and the method comprising:
outputting a drive signal to a first displacement sensor;
receiving and processing a signal from the first displacement sensor, and outputting a first ADSO signal;
receiving a CLK512 signal and the first ADSO signal, and timing or counting according to the CLK512 signal and the first ADSO signal, wherein the CLK512 signal is a square wave signal related to a period and phase of the drive signal; and
converting a first data obtained by timing or counting into an absolute displacement value of a gate of the first displacement sensor within a grating spacing;
wherein:
timing or counting according to the CLK512 signal and the first ADSO signal comprises:
timing or counting at the clock frequency starting from zero when a rising edge of the CLK512 signal is monitored; and
transmitting a current time or current count when a rising edge of the first ADSO signal is monitored; and
converting a first data obtained by timing or counting into an absolute displacement value of a gate of the first displacement sensor within a grating spacing comprises:

obtaining a position equivalent of the gate of the first displacement sensor within a grating spacing according to the first data obtained through timing and the clock frequency; and converting the position equivalent of the gate of the first displacement sensor within a grating spacing to an absolute displacement value of the gate of the first displacement sensor within a grating spacing.

19. The method of claim 18, further comprising:

digitally filtering the position equivalent of the gate of the first displacement sensor within a grating spacing; and correcting a deviation of the absolute displacement value of the gate of the first displacement sensor within a grating spacing.

20. The method of claim 18, further comprising:

receiving the CLK512 signal and the first ADSO signal, and counting a number of the grating spacing of displacement of the gate of the first displacement sensor according to the CLK512 signal and the first ADSO signal; and obtaining a total absolute displacement value of the gate of the first displacement sensor according to a second data obtained by counting the number of the grating spacing of displacement of the gate of the first displacement sensor and the first data.

21. The method of claim 20, further comprising:

acquiring a total absolute displacement equivalent $L_n$ of the gate of the first displacement sensor according to the following equation: $L_n = A_n + N_n \times M$, $A_n$ represents the first data, $N_n$ represents the second data, and M represents a resolution equivalent corresponding to each grating spacing of the first displacement sensor; and converting the total absolute displacement equivalent $L_n$ of the gate of the first displacement sensor into the total absolute displacement value of the gate of the first displacement sensor.

22. A method for displacement measurement for a sensing device, the sensing device comprising a first displacement sensor, and the method comprising:

outputting a drive signal to a first displacement sensor;

receiving and processing a signal from the first displacement sensor, and outputting a first ADSO signal;

receiving a CLK512 signal and the first ADSO signal, and timing or counting according to the CLK512 signal and the first ADSO signal, wherein the CLK512 signal is a square wave signal related to a period and phase of the drive signal;

converting a first data obtained by timing or counting into an absolute displacement value of a gate of the first displacement sensor within a grating spacing;

wherein:

timing or counting according to the CLK512 signal and the first ADSO signal comprises:

timing or counting at the clock frequency starting from zero when a rising edge of the CLK512 signal is monitored; and transmitting a current time or current count when a rising edge of the first ADSO signal is monitored; and the sensing device further comprises a second displacement sensor; the first displacement sensor comprises a plurality of grating spacings within one grating spacing of the second displacement sensor; and the method further comprises:

outputting the drive signal to the second displacement sensor;

receiving and processing a signal from the second displacement sensor and outputting a second ADSO signal;

receiving the second ADSO signal and the CLK512 signal, and timing or counting according to the second ADSO signal and the CLK512 signal and the clock frequency, thereby yielding a third data;

determining a number of the grating spacing of the displacement of the gate of the first displacement sensor according to the third data; and obtaining a total absolute displacement value of the gate of the first displacement sensor according to the number of the grating spacing of the displacement of the gate of the first displacement sensor and the first data.

* * * * *